(12) United States Patent
Kaempfer et al.

(10) Patent No.: US 8,467,295 B2
(45) Date of Patent: Jun. 18, 2013

(54) SYSTEM AND METHODS FOR DISTRIBUTED QUALITY OF SERVICE ENFORCEMENT

(75) Inventors: Gideon Kaempfer, Ra'anana (IL); Ariel Noy, Herzliya (IL); Oded Shimon, Tel Aviv (IL)

(73) Assignee: ConteXtream Ltd., Petach-Tikva (IL)

( * ) Notice: Subject to any disclaimer, the term of this patent is extended or adjusted under 35 U.S.C. 154(b) by 570 days.

(21) Appl. No.: 12/195,490

(22) Filed: Aug. 21, 2008

(65) Prior Publication Data

US 2010/0046368 A1    Feb. 25, 2010

(51) Int. Cl.
*G01R 31/08* (2006.01)
*H04L 12/28* (2006.01)

(52) U.S. Cl.
USPC ........................................ 370/235.1; 370/412

(58) Field of Classification Search
None
See application file for complete search history.

(56) References Cited

U.S. PATENT DOCUMENTS

| | | | |
|---|---|---|---|
| 5,640,399 A | 6/1997 | Rostoker et al. | |
| 6,216,173 B1 | 4/2001 | Jones et al. | |
| 6,452,915 B1 | 9/2002 | Jorgensen | |
| 6,538,992 B1 | 3/2003 | Subbiah et al. | |
| 6,603,738 B1 | 8/2003 | Kari et al. | |
| 6,687,247 B1 * | 2/2004 | Wilford et al. | 370/392 |
| 6,959,335 B1 * | 10/2005 | Hayball et al. | 709/227 |
| 7,013,084 B2 | 3/2006 | Battou et al. | |
| 7,075,919 B1 | 7/2006 | Wendt et al. | |
| 7,190,696 B1 | 3/2007 | Manur et al. | |
| 7,327,748 B2 | 2/2008 | Montalvo et al. | |
| 7,835,357 B2 | 11/2010 | Panwar et al. | |
| 2002/0031135 A1 | 3/2002 | Inoue | |
| 2002/0036984 A1 | 3/2002 | Chiussi et al. | |
| 2002/0049901 A1 | 4/2002 | Carvey | |
| 2003/0046336 A1 * | 3/2003 | D'Annunzio et al. | 709/203 |
| 2003/0058878 A1 | 3/2003 | Minnick et al. | |
| 2003/0061296 A1 * | 3/2003 | Craddock et al. | 709/212 |
| 2003/0093463 A1 | 5/2003 | Graf | |

(Continued)

FOREIGN PATENT DOCUMENTS

| | | |
|---|---|---|
| EP | 1345366 | 9/2003 |
| EP | 1418715 | 5/2004 |

(Continued)

OTHER PUBLICATIONS

International Preliminary Report on Patentability Dated May 14, 2010 From the International Bureau of WIPO Re. Application No. PCT/IL2008/001424.

(Continued)

*Primary Examiner* — Jutai Kao

(57) ABSTRACT

A grid router including devices forwarding session data over an unreliable network between the devices, and distributed means providing quality of service levels defined per session given network or device congestion, the devices including session-handling units and egress units forwaring session data to devices external to the network, the router transporting the data across a link with acknowledgement, identifying link congestion and modifying the transporting as a function of the congestion, the router also connecting a multicast session, token bucket shaper with token bucket shapers of external devices, joining session token bucket shapers used for unicast and multicast sessions to the multicast session, token bucket shaper and deducting tokens consumed by the multicast session from a token budget of the session token bucket shaper, the router attributing priorities to a single traffic session as the session moves through the router while keeping packet order within the session.

4 Claims, 8 Drawing Sheets

U.S. PATENT DOCUMENTS

| | | | |
|---|---|---|---|
| 2003/0123449 A1 | 7/2003 | Kuhl et al. | |
| 2003/0149773 A1 | 8/2003 | Harbin et al. | |
| 2003/0161303 A1 | 8/2003 | Mehrvar | |
| 2003/0198241 A1 | 10/2003 | Putcha et al. | |
| 2003/0214954 A1* | 11/2003 | Oldak et al. | 370/400 |
| 2004/0001499 A1 | 1/2004 | Patella et al. | |
| 2004/0042448 A1 | 3/2004 | Lebizay et al. | |
| 2004/0071164 A1 | 4/2004 | Baum | |
| 2004/0120261 A1 | 6/2004 | Ovadia et al. | |
| 2004/0163084 A1* | 8/2004 | Devadas et al. | 718/103 |
| 2004/0223497 A1 | 11/2004 | Sanderson et al. | |
| 2004/0233845 A1 | 11/2004 | Jeong et al. | |
| 2005/0025051 A1 | 2/2005 | Roeder | |
| 2005/0063392 A1* | 3/2005 | Ofuji et al. | 370/395.42 |
| 2005/0141426 A1* | 6/2005 | Hou | 370/235 |
| 2005/0175014 A1* | 8/2005 | Patrick | 370/395.43 |
| 2005/0210479 A1 | 9/2005 | Andjelic | |
| 2005/0226216 A1* | 10/2005 | Oyama et al. | 370/351 |
| 2006/0007935 A1 | 1/2006 | Bennett et al. | |
| 2006/0034239 A1 | 2/2006 | Abeta et al. | |
| 2006/0129676 A1 | 6/2006 | Modi et al. | |
| 2006/0159078 A1* | 7/2006 | Konda | 370/386 |
| 2006/0251109 A1* | 11/2006 | Muller et al. | 370/463 |
| 2007/0015525 A1 | 1/2007 | Beming et al. | |
| 2007/0058548 A1 | 3/2007 | Babonneau et al. | |
| 2007/0121499 A1* | 5/2007 | Pal et al. | 370/230 |
| 2007/0153697 A1 | 7/2007 | Kwan et al. | |
| 2007/0165529 A1* | 7/2007 | Nakamura et al. | 370/235 |
| 2007/0220059 A1 | 9/2007 | Lu et al. | |
| 2007/0280245 A1 | 12/2007 | Rosberg | |
| 2007/0280277 A1 | 12/2007 | Lund | |
| 2008/0025290 A1 | 1/2008 | Barkai | |
| 2008/0198867 A1 | 8/2008 | Moll et al. | |
| 2008/0212472 A1* | 9/2008 | Musacchio et al. | 370/232 |
| 2008/0240154 A1 | 10/2008 | Oved | |
| 2008/0259798 A1* | 10/2008 | Loh et al. | 370/235 |
| 2008/0259936 A1 | 10/2008 | Hussain et al. | |
| 2009/0109968 A1 | 4/2009 | Noy et al. | |
| 2009/0122702 A1* | 5/2009 | Chew et al. | 370/235 |
| 2010/0017535 A1 | 1/2010 | Aloni et al. | |
| 2010/0054117 A1 | 3/2010 | Southworth et al. | |
| 2010/0118728 A1 | 5/2010 | Prudent | |
| 2010/0202295 A1* | 8/2010 | Smith et al. | 370/235.1 |
| 2010/0214913 A1 | 8/2010 | Kompella | |
| 2011/0110373 A1 | 5/2011 | Ghosh et al. | |

FOREIGN PATENT DOCUMENTS

| | | |
|---|---|---|
| WO | WO 2008/129790 | 10/2008 |
| WO | WO 2009/057109 | 5/2009 |
| WO | WO 2010/020988 | 2/2010 |

OTHER PUBLICATIONS

International Search Report and the Written Opinion Dated Mar. 10, 2010 From the International Searching Authority Re.: Application No. PCT/IL2009/000810.
International Search Report Dated Nov. 2, 2007 From the International Searching Authority Re.: Application No. PCT/IL06/01476.
Official Action Dated May 11, 2009 From the US Patent and Trademark Office Re.: U.S. Appl. No. 11/615,977.
Official Action Dated Jan. 19, 2010 From the US Patent and Trademark Office Re.: U.S. Appl. No. 11/615,977.
Written Opinion Dated Nov. 2, 2007 From the International Searching Authority Re.: Application No. PCT/IL06/01476.
Bitar "Applicability of Access Node Control Mechanism to PON Based Broadband Networks", known as draft-bitar-wadhwa-ancp-pon-01.
Communication Relating to the Results of the International Search Dated Nov. 20, 2009 From the International Searching Authority Re.: Application No. PCT/IL2009/000810.
Response Dated Apr. 19, 2010 to Official Action of Jan. 19, 2010 From the US Patent and Trademark Office Re.: U.S. Appl. No. 11/615,977.
International Search Report Dated Mar. 9, 2009 From the International Searching Authority Re.: Application No. PCT/IL2008/001424.
Written Opinion Dated Mar. 9, 2009 From the International Searching Authority Re.: Application No. PCT/IL2008/001424.
Official Action Dated Apr. 23, 2010 From the US Patent and Trademark Office Re.: U.S. Appl. No. 11/927,861.
Supplementary European Search Report and the European Search Opinion Dated May 31, 2010 From the European Patent Office Re. Application No. 06821659.7.
Response Dated Jul. 22, 2010 to Official Action of Apr. 23, 2010 From the US Patent and Trademark Office Re.: U.S. Appl. No. 11/927,861.
Communication Pursuant to Rule 70(2) and 70a(2) EPC Dated Jun. 17, 2010 From European Patent Office Re. Application No. 06821659.7.
Official Action Dated Aug. 4, 2010 From the US Patent and Trademark Office Re.: U.S. Appl. No. 11/615,977.
U.S. Appl. No. 11/615,977, filed Dec. 24, 2006, Sharon Barkai.
U.S. Appl. No. 11/927,861, filed Oct. 30, 2007, Ariel Noy et al.
Official Action Dated Jan. 10, 2011 From the US Patent and Trademark Office Re.: U.S. Appl. No. 11/615,977.
Response Dated Jan. 6, 2011 to Official Action of Oct. 7, 2010 From the US Patent and Trademark Office Re.: U.S. Appl. No. 11/927,861.
Supplementary European Search Report and the European Search Opinion Dated Oct. 26, 2010 From the European Patent Office Re. Application No. 08845163.8.
Bianco et al. "Multistage Switching Architectures for Software Routers", IEEE Network, XP011188056, 21(4): 15-21, Jul. 1, 2007. p. 18, l-h col., Line 19—p. 21, l-h col., Line 34, Fig.4.
Official Action Dated Oct. 7, 2010 From the US Patent and Trademark Office Re.: U.S. Appl. No. 11/927,861.
Response Dated Oct. 21, 2010 to Official Action of Aug. 4, 2010 From the US Patent and Trademark Office Re.: U.S. Appl. No. 11/615,977.
Official Action Dated May 10, 2011 From the US Patent and Trademark Office Re.: U.S. Appl. No. 11/927,861.
Bianco et al. "Multistage Switching Architectures for Software Routers", IEEE Network, XP011188056, 21(4): 15-21, Jul./Aug. 2007. p. 18, l-h col., Line 19—p. 21, l-h col., Line 34, Fig.4.
Official Action Dated Oct. 24, 2011 From the US Patent and Trademark Office Re.: U.S. Appl. No. 11/927,861.
Official Action Dated Jan. 31, 2012 From the US Patent and Trademark Office Re.: U.S. Appl. No. 11/615,977.
International Preliminary Report on Patentability Dated Mar. 3, 2011 From the International Bureau of WIPO Re.: Application No. PCT/IL2009/000810.
International Search Report and the Written Opinion Dated Apr. 6, 2011 From the International Searching Authority Re. Application No. PCT/IL2010/001074.
Response Dated Apr. 11, 2011 to Official Action of Jan. 10, 2011 From the US Patent and Trademark Office Re.: U.S. Appl. No. 11/615,977.
Official Action Dated Jul. 28, 2011 From the US Patent and Trademark Office Re.: U.S. Appl. No. 11/615,977.
Response Dated Aug. 10, 2011 to Official Action of May 10, 2011 From the US Patent and Trademark Office Re.: U.S. Appl. No. 11/927,861.
Official Action Dated Apr. 25, 2012 From the US Patent and Trademark Office Re. U.S. Appl. No. 12/647,145.
Response Dated Nov. 28, 2011 to Official Action of Jul. 28, 2011 From the US Patent and Trademark Office Re.: U.S. Appl. No. 11/615,977.
International Preliminary Report on Patentability Dated Mar. 6, 2012 From the International Preliminary Examining Authority Re. Application No. PCT/IL2010/001074.
Response Dated Sep. 27, 2011 to International Search Report and the Written Opinion of Apr. 6, 2011 From the International Searching Authority Re. Application No. PCT/IL2010/001074.
Official Action Dated Mar. 11, 2013 From the US Patent and Trademark Office Re.: U.S. Appl. No. 11/615,977.
Official Action Dated Feb. 28, 2013 From the US Patent and Trademark Office Re.: U.S. Appl. No. 11/927,861.

\* cited by examiner

SYSTEM AND METHODS FOR DISTRIBUTED QUALITY OF SERVICE ENFORCEMENT

FIELD OF THE INVENTION

The present invention relates generally to quality of service in data networks and in distributed data networks and routers in particular.

BACKGROUND OF THE INVENTION

Communications networks are ubiquitous. The Internet is everywhere and carriers are attempting to provide more and more services over it to their customers.

Reference is now made to FIG. 1, which illustrates how a signal from a source 10 is distributed to customers 12 over the Internet 14. Source 10 might be, for example, a broadcast news station or a movie channel. The Internet 14, or any other wide area network (WAN), is typically organized into different levels of networks. There typically is a national backbone network 16 and multiple metro edge networks 18. Small metropolitan areas may have a single edge network, as shown, while larger metropolitan areas may have a central edge network with smaller sub-networks. Finally, each customer 12 may be connected to the Internet 14 via access networks 20. The latter are typically low bandwidth, copper connections, while national backbone 16 and edge networks 18 may be formed from high bandwidth, optical fibers.

Networks 16 and 18 are typically formed of multiple points of presence (POPs) 22 connected, with "bus" connectivity, in a ring 23 of optical fibers. Due to the bus connection, each POP 22 can transmit directly to any other POP 22 in the ring. This minimizes the number of POPs through which any piece of data has to travel.

POPs 22 may be formed of multiple routers, each typically having I/O ports residing on line cards and a switching fabric connecting the line cards to each other. The routers use multiple mechanisms, such as shaping, queuing, backpressure, etc., to switch large amounts of traffic with few errors.

The routers may also have other mechanisms to handle network conditions between the routers, such as routing protocols, DiffServ (classification at the edge of the network and class of service (CoS) control in the core of the network) and IntServ (end to end resource reservation and enforcement of priorities and rates).

The bandwidth capacity between POPs 22 is very high. However, if the traffic is higher than the capacity, the network becomes congested. Links between routers in the core of a network typically become clogged due to aggregate traffic flow and this congestion typically affects the service: packets may be delayed or dropped.

When the network is not congested, a packet will move without delay through POPs 22A and 22B and towards its final destination 12. However, when the network is congested, the traffic management mechanisms of the routers in POPs 22 will delay a packet, due to other packets being handled or transmitted before it at each hop on its path, or they will drop it. The latter may occur when a queue within one of the routers of a POP 22 is filled or when a stream has limited latency constraints (which may define when a packet is no longer of use e.g. a packet in an audio stream which is part of a phone call may no longer be usable if it comes too late compared to the other packets in the stream).

SUMMARY OF THE PRESENT INVENTION

There is provided, in accordance with a preferred embodiment of the present invention, a grid router which has a plurality of devices and distributed units for providing quality of service (QoS) levels. The devices forward data according to sessions over an unreliable network between the devices and include a first multiplicity of mailbox units to handle the sessions and a second multiplicity of egress units to forward the session data to devices external to the network. The QoS levels are defined for each session in the presence of congestion in the network or the devices.

Additionally, in accordance with a preferred embodiment of the present invention, the devices comprise transport units to transport the data across a link from the mailbox units to the egress units with acknowledgement, and wherein the means for providing comprises a congestion determiner in each the mailbox unit to determine congestion of the network from information from the transport units.

Further, in accordance with a preferred embodiment of the present invention, the congestion determiner comprises an interrogator to interrogate internal controls of the transport unit.

Moreover, in accordance with a preferred embodiment of the present invention, the transport units may be TCP units, or RDMA (remote direct memory access) units.

Further, in accordance with a preferred embodiment of the present invention, each transport unit includes a transmission queue and a completed transmission queue and the congestion determiner includes a queue reviewer to determine the congestion of the network from the difference in state of packets in the transmission queue and in the completed transmission queue.

Alternatively, in accordance with a preferred embodiment of the present invention, the transmission queue is an RDMA work queue and the completed transmission queue is an RDMA completion queue.

Moreover, in accordance with a preferred embodiment of the present invention, the distributed unit also includes a per session shaper to control the flow of data of a session to its associated egress unit in accordance with the output of the congestion determiner Further, in accordance with a preferred embodiment of the present invention, the distributed unit includes a priority level counter in each egress unit and a dynamic priority scheduler in each mailbox unit. The priority level counters determine the amount of data per priority level currently held in each egress unit. The dynamic priority schedulers change the transmission eligibility of a current packet of each the session in accordance with the output of its associated congestion determiner and priority level counter.

Still further, in accordance with a preferred embodiment of the present invention, the dynamic priority scheduler includes active session lists, one per priority level, and a dequeuing engine. The active session lists list which session queues are currently non-empty at which priority level. The dequeuing engine transmits data from session queues listed in one active session list at a time and determines, for each session, whether or not to change its priority level.

Moreover, in accordance with a preferred embodiment of the present invention, the dequeuing engine includes a scanner to scan the active session lists in order from highest to lowest priority level.

Additionally, in accordance with a preferred embodiment of the present invention, the dequeuing engine includes a unit to change the priority level of a session queue within a range of allowable priority levels assigned to the session queue as a function of a current transmission rate of the queue.

Further, in accordance with a preferred embodiment of the present invention, the dequeuing engine includes a selector to select sessions within the current active session list.

Still further, in accordance with a preferred embodiment of the present invention, the selector includes a unit to randomly select the sessions.

Additionally, in accordance with a preferred embodiment of the present invention, the distributed unit includes distributed controllers of transmission rates of session queues in the mailbox units.

Further, in accordance with a preferred embodiment of the present invention, the distributed controllers include per session, token bucket shapers in each mailbox unit, a rate controller in each mailbox unit and a rate measurer in each egress unit Each rate controller changes transmission rates of the per session, token bucket shapers and each rate measurer determines transmission rates at least of per session, output token bucket shapers and indicates a change in the rates to the rate controller of the associated mailbox unit for the session.

Moreover, in accordance with a preferred embodiment of the present invention, the rate measurer includes per session counters to determine the amount of data currently in a per session output queue, watermarks defining congestion levels and a rate determiner to determine how to change transmission rates of token buckets affecting the output, session queue as a function of output of said counters and said watermarks.

Additionally, in accordance with a preferred embodiment of the present invention, the rate determiner includes a unit to determine the transmission rate changes, wherein the transmission rate changes are generated as a percentage of a maximum rate, as a percentage of the current rate or as absolute increments.

Additionally, in accordance with a preferred embodiment of the present invention, the distributed unit includes, in each egress unit, at least one unicast token bucket shaper joined to a multicast token bucket shaper The at least one unicast token bucket shaper deducts tokens consumed by the multicast token bucket shaper from its token budget prior to transmitting unicast packets.

Additionally, in accordance with a preferred embodiment of the present invention, the distributed unit also includes a single session queue for the multicast session in one of the mailbox units, associated with multiple output queues. In each egress unit associated with one of the output queues, the multicast session, token bucket shaper is directly associated with token bucket shapers of external devices. The devices may be capable of packet replication.

Moreover, in accordance with a preferred embodiment of the present invention, the at least one unicast token bucket shaper is a hierarchy of unicast token bucket shapers.

There is also provided, in accordance with a preferred embodiment of the present invention, a method of transporting data across a link subject to congestion. The method includes transporting the data with a transport unit which transports the data across the link with acknowledgement, interrogating the transport unit to determine the presence of congestion on the link and modifying the transporting as a function of the congestion.

Additionally, in accordance with a preferred embodiment of the present invention, the interrogating includes interrogating internal controls of the transport unit.

Moreover, in accordance with a preferred embodiment of the present invention, the transport unit includes a transmission queue and a completed transmission queue and the determining includes reviewing the queues to determine the congestion from the difference in state of packets in the transmission queue and in the completed transmission queue.

Further, in accordance with a preferred embodiment of the present invention, the transmission queue is an RDMA work queue and the completed transmission queue is an RDMA completion queue.

There is also provided, in accordance with a preferred embodiment of the present invention, a method including connecting a multicast session, token bucket shaper with token bucket shapers of external devices, joining at least session token bucket shapers used for unicast sessions to the multicast session, token bucket shaper, and, prior to transmitting unicast packets, deducting tokens consumed by the multicast session from a token budget of the session token bucket shaper.

Additionally, in accordance with a preferred embodiment of the present invention, at least one of the external devices is capable of packet replication.

Moreover, in accordance with a preferred embodiment of the present invention, the method includes joining a hierarchy of unicast token bucket shapers to said multicast session, token bucket shaper.

There is still further provided, in accordance with a preferred embodiment of the present invention, a method including attributing a plurality of priorities to a single traffic session as the session moves through a router while keeping packet order within the session.

Finally, in accordance with a preferred embodiment of the present invention, the attributing includes changing the priority of a packet at the head of a transmission queue to one of the plurality of priorities in response to network conditions.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
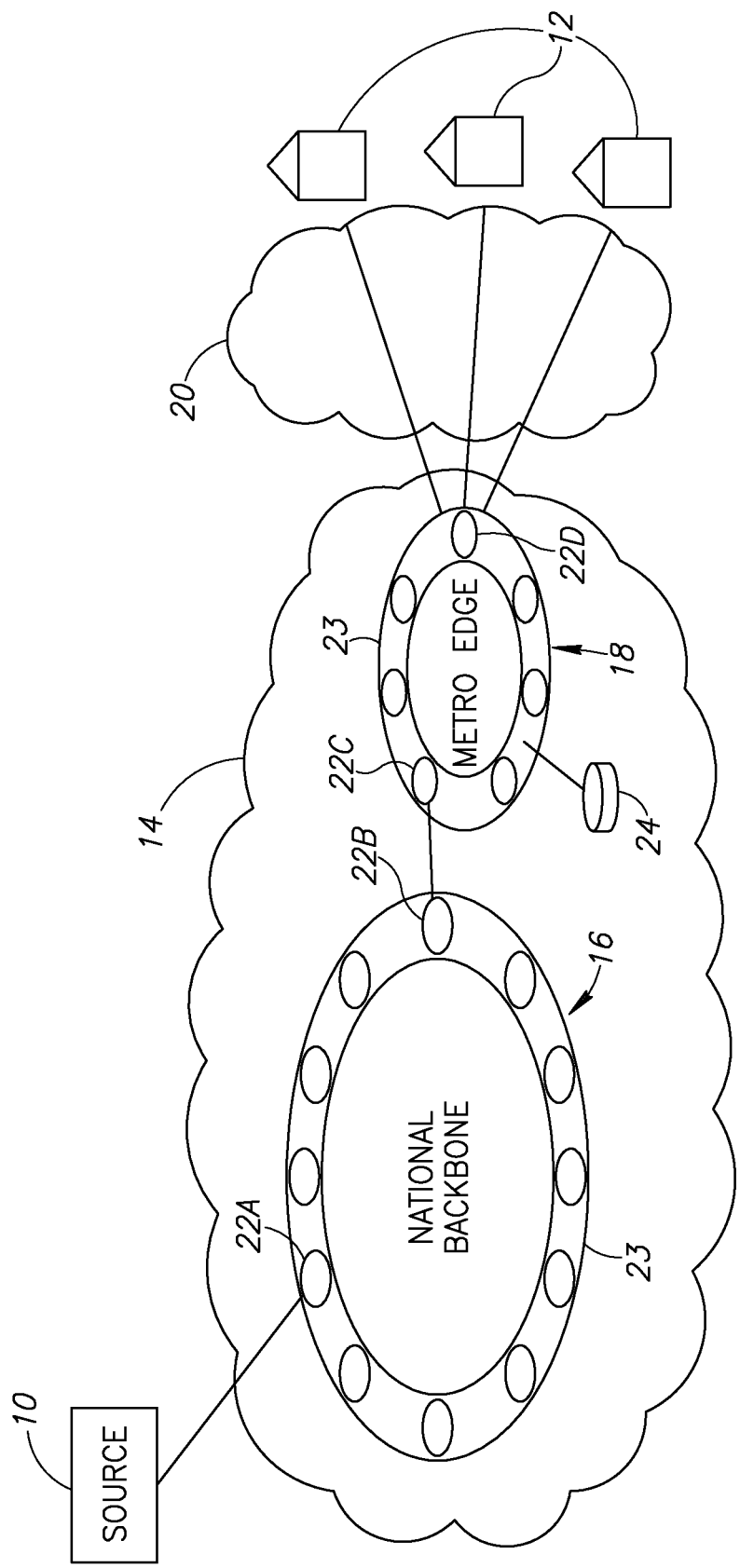
FIG. 1 is a schematic illustration of the prior art distribution of data over the Internet.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The present invention describes a system and methods for generally providing quality of service in a network of distributed nodes operating together as a single grid router An exemplary such network of distributed nodes which may utilize these methods may be described in U.S. patent application Ser. Nos. 11/615,977 and 11/927,861, assigned to the common assignees of the present invention and incorporated herein by reference. The present invention will be described with respect to the network of U.S. patent applications Ser. Nos. 11/615,977 and 11/927,861. However, it will be appreciated that other networks or routers may also utilize the systems and methods described herein.

Briefly, U.S. patent applications Ser. Nos. 11/615,977 and 11/927,861 describe a metropolitan edge network operating as a grid router The latter organizes the data moving through it by the services to be provided rather than by the topology of the network and/or the line configuration. For each service, the metropolitan edge network may allocate a mailbox, or "session", whose size and quality of service (defined by bandwidth, download rates, security control, etc.) may be a function of the amount of data to be transferred therethrough at any given time. The mailboxes act as queues, where data may be written in at one end and read out at the other end.

Figure 2A:
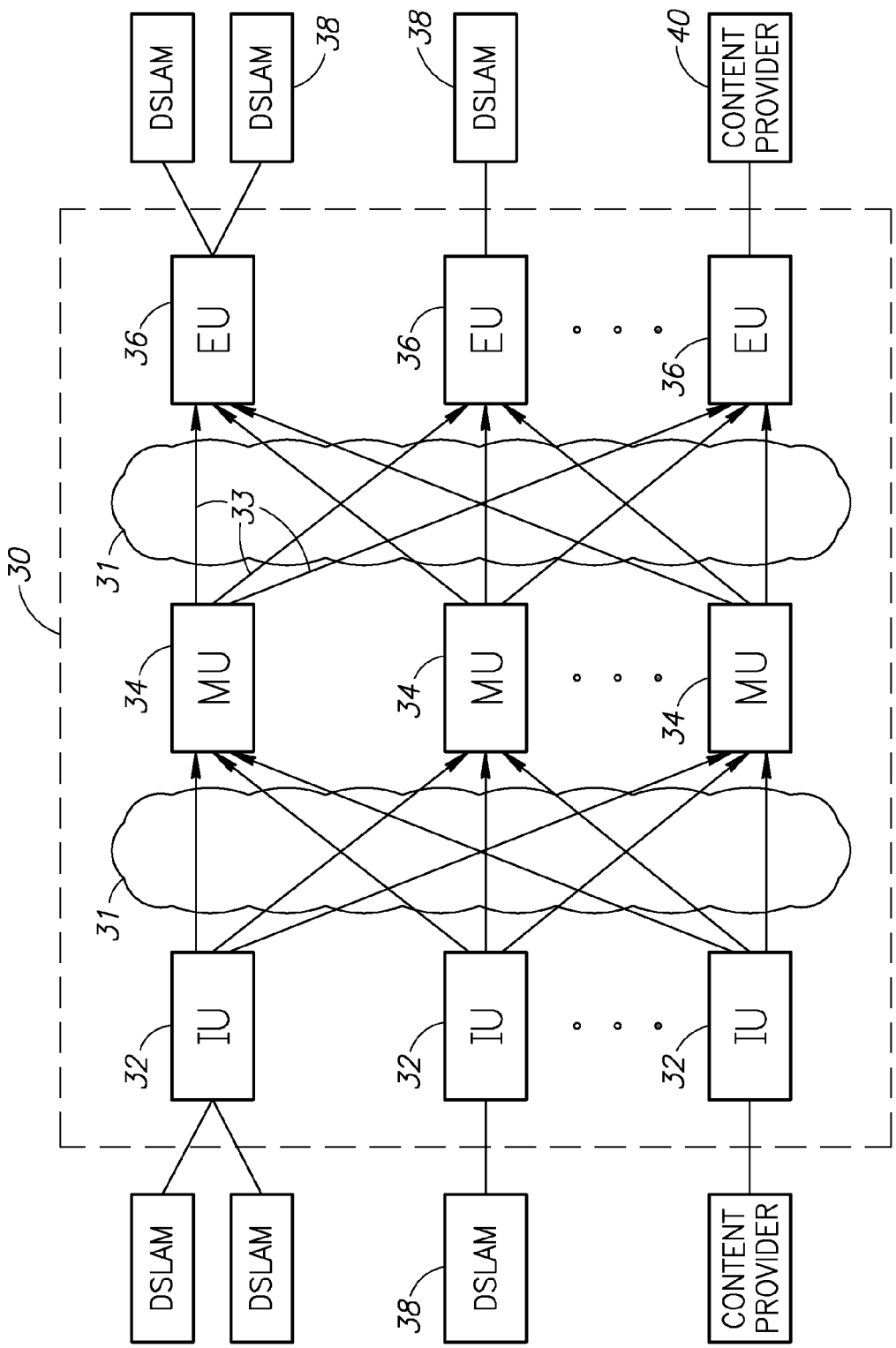
FIGS. 2A and 2B are schematic illustrations of a grid router and its operation.
Figure 2B:
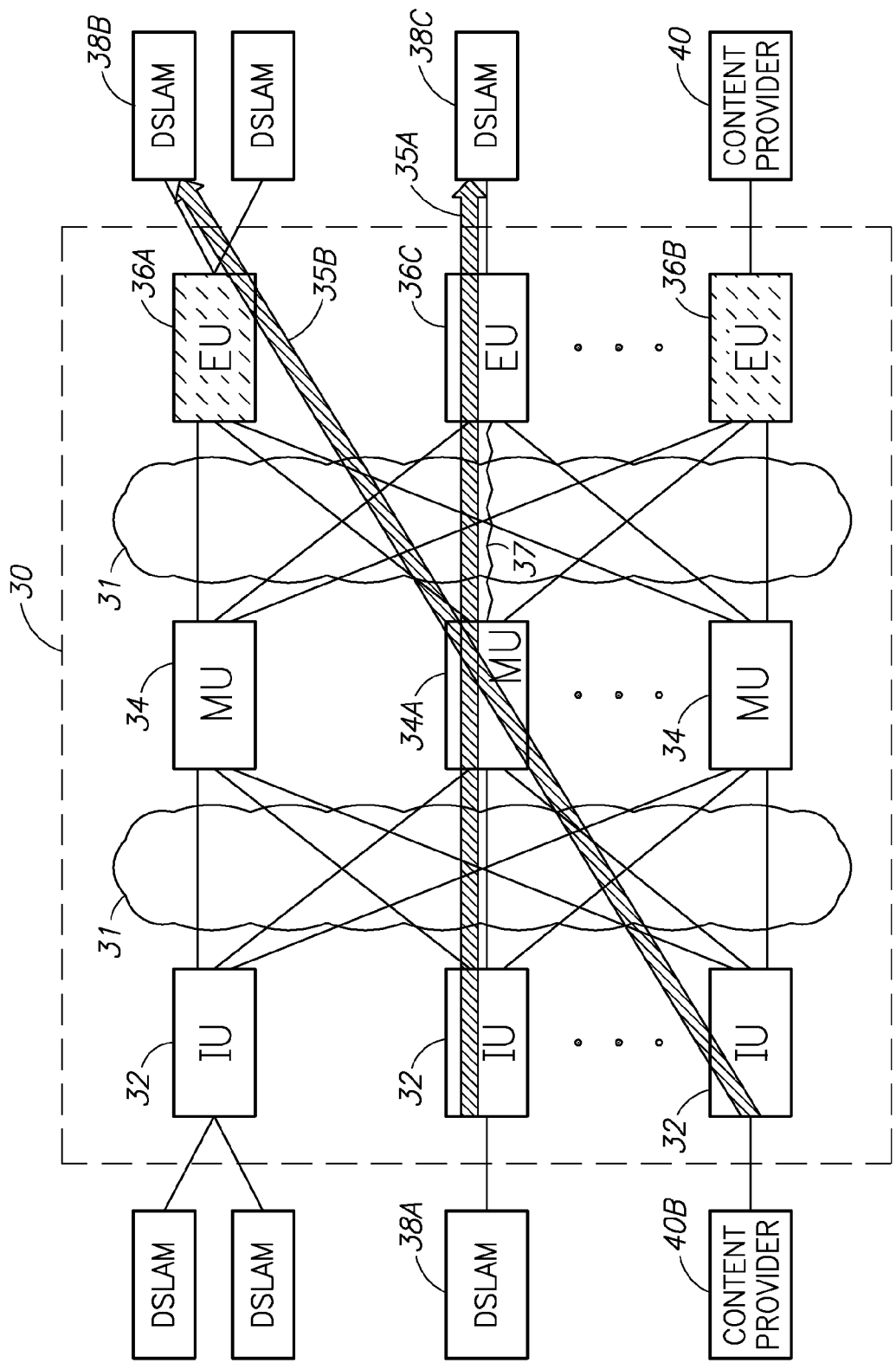

FIGS. 2A and 2B, to which reference is now made, show an improved grid router, labeled 30, constructed and operative in accordance with a preferred embodiment of the present invention. Grid router 30 may comprise a plurality of ingress units (IU) 32, a multiplicity of mailbox units (MU) 34 and a plurality of egress units (EU) 36, where the units may be implemented with off-the-shelf servers, and, in accordance with a preferred embodiment of the present invention, may be connected in a 3-stage Clos network. The ingress and egress units may be folded together into a unified front end server which may or may not also contain mailbox units 34. However, logically, each unit may function as a distinct stage within the Clos network.

The Clos network may connect each mailbox unit 34 with each ingress unit 32 and each egress unit 36, such that each mailbox unit 34 may be accessed by each unit 32 or 36 at the same time. The Clos network may be connected by a physical network, indicated by clouds 31. Physical network 31 may be any type of network, such as a TCP/IP or Infiniband network, which, typically, does not provide any quality of service guarantees.

Physical network 31 may include direct connections between units and/or may be formed of multiple, switched connections. However, as described in detail hereinbelow, grid router 30 may implement logical direct connections between units, as indicated by arrows 33.

Grid router 30 may implement traffic control mechanisms, described in more detail hereinbelow, to provide a multiplicity of quality of service levels. In accordance with a preferred embodiment of the present invention, these mechanisms may be implemented across units, to control the flow of sessions, particularly out of mailbox units 34, but also out of other session queues. Thus, traffic control may occur at least at the point of switching (i.e. at the mailbox) and before the packet may begin flowing out of router 30.

Ingress units 32 may perform traffic classification and may forward packets based on their session association to an appropriate mailbox unit. To do so, each ingress unit 32 may identify incoming packets and may associate them with session queues (or mailboxes). Each ingress unit 32 may create headers for the packets explicitly identifying the sessions to which they belong and may send each packet with its headers to the mailbox unit 34 which handles the mailbox (session).

Each mailbox unit 34 may insert the packets into their appropriate session queues (or virtual output queues) and may schedule packets for transmission, via shapers, to the appropriate egress unit 36. In accordance with a preferred embodiment of the present invention, both the scheduling and the shaping may respond to the dynamic network conditions (of either the Clos network or of external networks (not shown) to which router 30 may be connected) by adjusting scheduling and shaping parameters. As described in more detail hereinbelow, information about the network conditions may be utilized to move packets through grid router 30.

Each egress unit 36 may insert the packets into their appropriate egress session queues (e.g. output queues) and may schedule packets for transmission to their external target (typically towards the access network, shown in FIGS. 2A and 2B as connecting to DSLAMs 38 and content providers 40). In accordance with a preferred embodiment of the present invention, each egress unit 36 may also provide information about network conditions.

FIG. 2B illustrates the movement of session data from two sessions, 35A and 35B, through grid router 30. For session 35A, DSLAM 38A may send its data to DSLAM 38C and for session 35B, content provider 40B may send its data to DSLAM 38B. In accordance with a preferred embodiment of the present invention, the session attributes may be used to provide the desired level of service depending on network and internal system congestion conditions. The attributes may include a desired bandwidth and one or more priority designations to be enforced depending on dynamic conditions.

For example, two egress units, labeled 36A and 36B, may be congested, as indicated by the hashing, and a link 37, between mailbox unit 34A and egress unit 36C may be congested, as indicated by the fact that link 37 is jagged The congestion at egress unit 36A may affect session 35B while the congestion on link 37 may affect session 35A. As discussed hereinbelow, grid router 30 may change its operation in response to the congestion in an attempt to maintain quality of service for sessions 35A and 35B.

Grid router 30 may utilize multiple, across device, traffic control mechanisms. For example, grid router 30 may use a set of implicit and explicit feedback mechanisms to control the traffic flow through the system when there are congested resources (such as congested nodes 36A and 36B or link 37).

In addition to congestion notification, packets traversing grid router 30 may be attributed internal priority levels based on their classification, dynamic queue states and consumed bandwidth. In particular, packets transmitted from a single session queue may be attributed more than one priority level. This is shown schematically in FIG. 3, to which reference is now made, while further details are provided hereinbelow. Similar reference numerals refer to similar elements.

Figure 3:
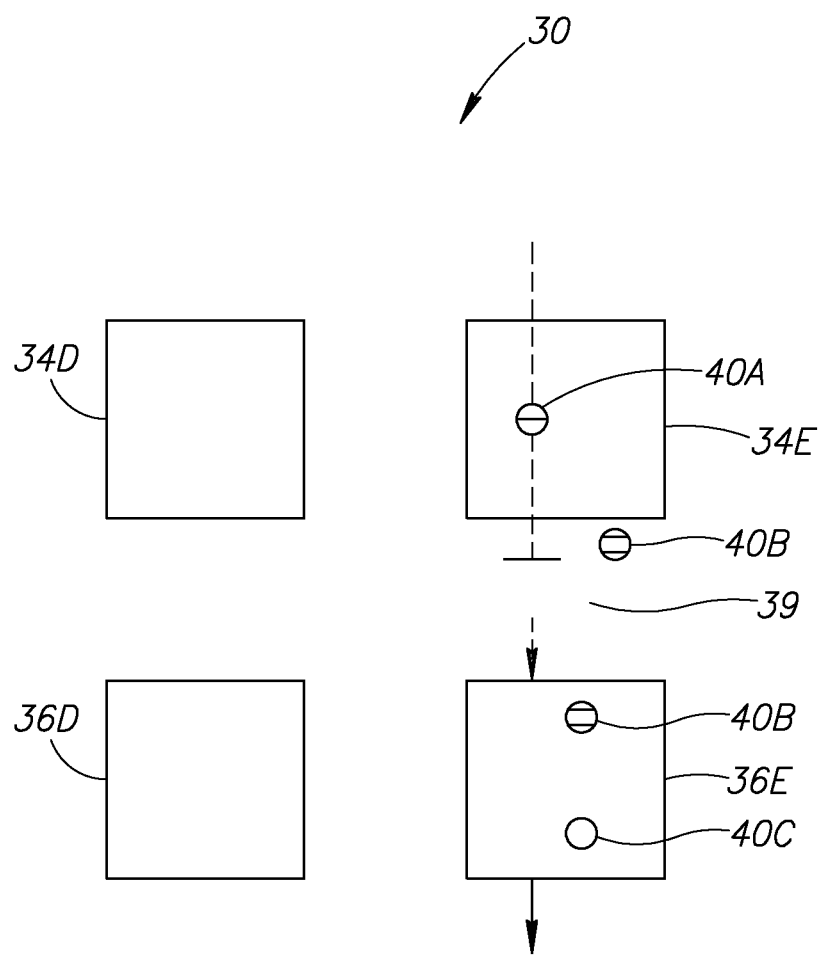
FIG. 3 is a schematic illustration of changing priorities of packets, useful in understanding the operation of the grid router of FIG. 2.

In FIG. 3, only a portion of grid router 30 is shown, with only two of each type of unit, labeled D and E. A packet 40 may arrive at mailbox unit 34E with a first priority level, indicated by a circle with a single line and marked 40A. When packet 40 may be ready for scheduling, mailbox unit 34E may determine that the current bandwidth of data being forwarded from the session of packet 40 needs to be changed (indicated by a broken connection 39) and may change the priority of packet 40 to one of a set of priority levels based on bandwidth thresholds attributed to the session of packet 40. Packet 40 may become packet 40B, indicated by a circle with two lines.

Mailbox unit 34E may now consider the changed priority of packet 40B when scheduling it for transmission.

A similar process may occur to move packet 40 through egress unit 36E. The internal priority of packet 40 may be changed, indicated by the circle 40C with no lines in it Egress unit 36E may schedule packet 40C for output according to its new priority level.

It will be appreciated that priorities may change only when packets are at the head of a session queue, thereby maintaining the order of the packets despite the changing internal priority levels of packet 40 as it passes through.

Figure 4:
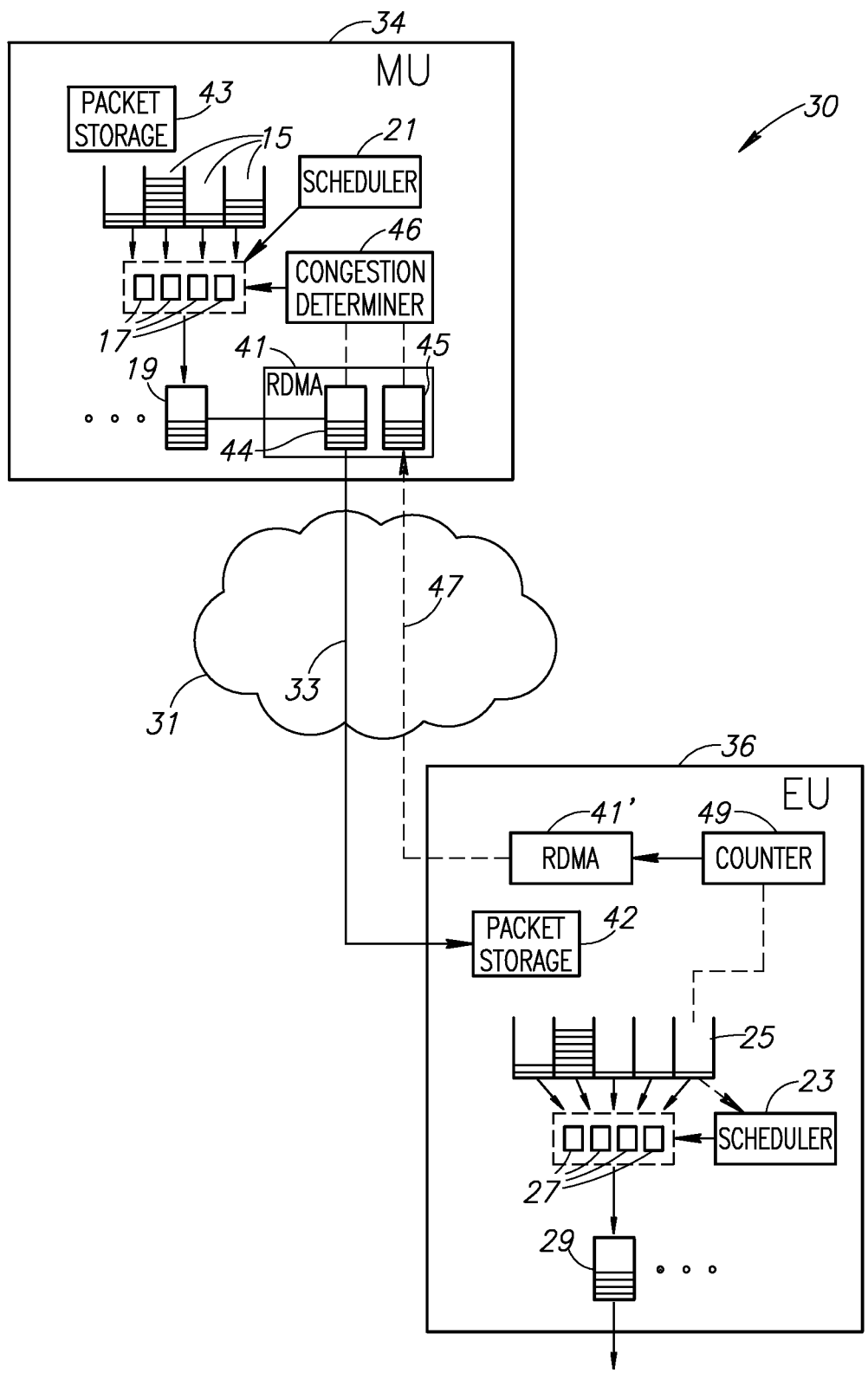
FIG. 4 is a schematic illustration of traffic flow control of the grid router of FIG. 2.

Reference is now made to FIG. 4, which illustrates the traffic flow control of grid router 30. For clarity, only one mailbox unit 34 and one egress unit 36 are shown. Similar reference numerals refer to similar elements of previous figures.

Mailbox unit 34 may have a plurality of session queues 15, shapers 17, one per session queue, a scheduler 21 and a multiplicity of output queues 19, one per egress unit 36. Only one queue 19 is shown, for clarity. Egress unit 36 may have a similar structure, of a plurality of session queues 25, shapers 27 associated with queues 25, a scheduler 23 and an output queue 29 (as shown), or multiple output queues, one per egress port. It will be appreciated that units 34 and 36 typically have many more session queues 15 and 25 but only a few are shown for clarity.

As described in U.S. patent applications Ser. Nos. 11/615,977 and 11/927,861, units 32, 34 and 36 write the packets from one to another using RDMA (remote direct memory access) protocol. Thus, mailbox unit 34 may have a sending RDMA unit 41 and egress unit 36 may have a receiving RDMA unit 41'. These may provide logical direct connections 33 that may be reliable connections, regardless of whether or not underlying physical network 31 is reliable.

RDMA unit 41 may write the packets of each output queue 19 into a packet storage area 42 of its associated egress unit 36. Other elements of mailbox unit 34 may fill queues 19, readying the packets for transmission. Output queues 19 may store the packets themselves or may store indicators to packets stored in a packet storage area 43 of mailbox unit 34.

Applicants have realized that the internal processing elements of RDMA units 41 may be analyzed to provide implicit information on the congestion state of the internal Clos network or of physical network 31. As part of the RDMA protocol, RDMA unit 41 may comprise a work queue 44, which may list which packets of output queue 19 are to be transmitted, and a completion queue 45, which may list which packets were transferred, successfully or not. RDMA unit 41 may operate by taking each packet of its work queue 44 and, as indicated by arrow 33, may write the packet directly into an available portion of packet storage area 42 of egress unit 36. In turn, for each packet received, a receiver RDMA unit 41' on the target side (in this case, egress unit 36) may indicate the transfer of each packet, typically by writing an indication along a parallel RDMA connection, indicated by arrow 47, directly into completion queue 45.

Applicants have realized that the varying states of work queue 44 and completion queue 45 may provide information about how congested link 33 might be. For example, when link 33 is not congested, work queue 44 may receive X packets during Y milliseconds and, during the same period Y, completion queue 45 may fill up with X or close to X transmission indications. However, when link 33 may be congested, work queue 44 may receive X packets to be written while completion queue 45 may receive indications only about Z packets being transferred, where Z is significantly less than X within the same period Y.

In accordance with a preferred embodiment of the present invention, mailbox unit 34 may additionally comprise a congestion determiner 46 which may periodically check queues 44 and 45 to determine how congested link 33 may be. Congestion determiner 46 may first remove any packets from work queue 44 that have a successful transmission indication in completion queue 45. Congestion determiner 46 may then consider the number of remaining packets in work queue 44. If it is below a threshold level, then link 33 may not be congested. However, when the amounts increase, then link 33 may be congested. Determiner 46 may indicate to each shaper 17 associated with a session to be transmitted on link 33 to change its operation. For example, determiner 46 may indicate to shaper(s) 17 to slow down their rates of production when link 33 is congested. Alternatively, determiner 46 may reduce the transmission rate for lower priority packets while maintaining the rate for higher priority packets. Determiner 46 may indicate to each relevant shaper 17 to return to its regular operation once the congestion has cleared.

It will be appreciated that the present invention is applicable to any transport mechanisms which, like RDMA, provide some kind of acknowledgement about the transfer of data. This acknowledgement may be in the form of a transmission queue, like the work queue in RDMA, and a completed transmission queue, like the completion queue in RDMA.

Determiner 46 may also determine when egress unit 36 is congested. For this embodiment, egress unit 36 may comprise a priority level counter unit 49 which may keep track of packets in input queues 25 and their priority levels, keeping count of how many packets or bytes were transferred at each priority level and from each mailbox unit 34. Receiver RDMA unit 41' may transfer this information to congestion determiner 46 which, in turn, may indicate to scheduler 21 to change the priorities of at least the session queues 15 corresponding to the congested priorities in egress unit 36.

It will be appreciated that these two mechanisms, which work across devices, change how shaper 17 and scheduler 21 act upon mailbox session queues 15, thereby controlling the flow of a packet as it begins its path to its final destination.

It will further be appreciated that FIG. 4 shows the operation across only one link 33 and that similar operations occur across each link in grid router 30.

Figure 5A:
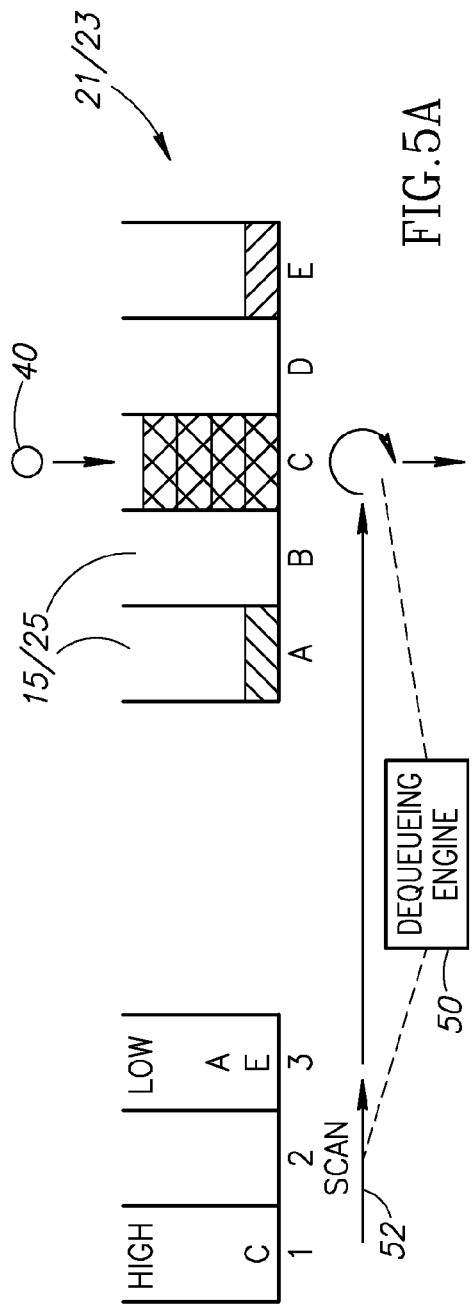
FIGS. 5A and 5B are schematic illustrations of the operation of schedulers, forming part of the grid router of FIG. 2, in changing priorities of packets in response to conditions.
Figure 5B:
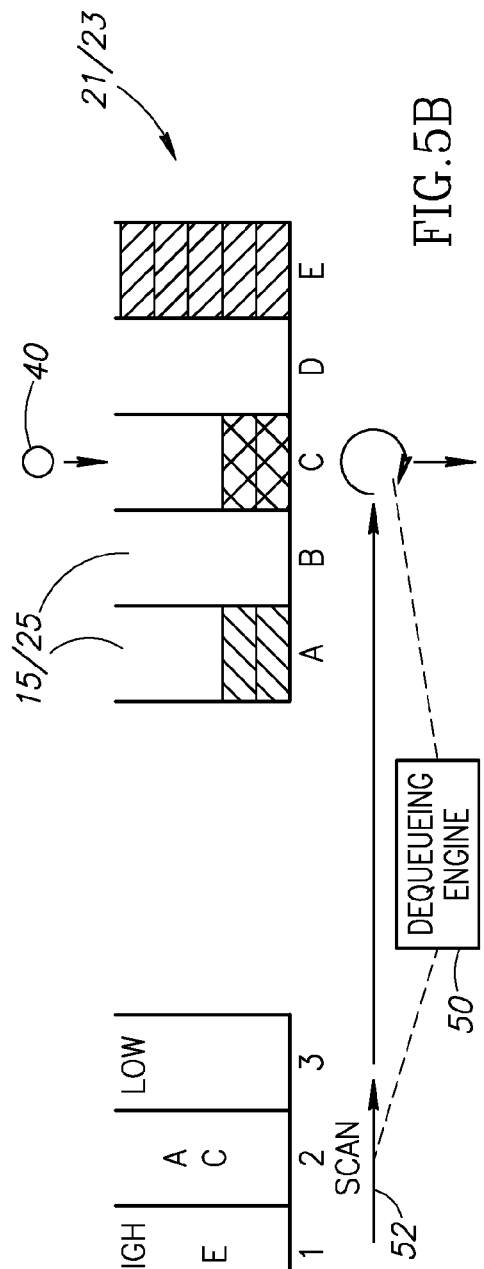

Reference is now made to FIGS. 5A and 5B, which illustrates a further operation of schedulers 21 and 23 in changing priorities of packets in response to conditions. Similar reference numerals in FIGS. 5A and 5B refer to similar elements of previous figures.

As discussed with respect to FIG. 4, packets 40 may first placed into session queues 15 or 25 (either mailbox session queues 15 or output session queues 25). For example, FIG. 5 shows 5 exemplary session queues, labeled A-E.

At a first time, in FIG. 5A, session queues A and E have only a few packets each while session queue C has many packets. At a second time, in FIG. 5B, the situation has changed and session queues A and C have a medium amount of packets while session queue E has a lot of packets in it. In accordance with a preferred embodiment of the present invention, units 34 and 36 may also comprise active session lists 1-3, one per priority. Each active session list 1-3 may list which session queues are its priority level, where, in FIGS. 5, level 1 is the highest priority.

In FIG. 5A, session queue C may be of highest priority while session queues A and E may have priority level 3. However, in FIG. 5B, session queue E may be of highest priority while session queues A and C may have priority level 2. As detailed hereinbelow, session queue priority may be a function of the rate at which a session was recently serviced and the predefined set of priorities assigned to it (which are configured to be rate dependent). In cases of congestion, lower priority traffic will be throttled, possibly creating a backlog of lower priority traffic. If such a congested queue has more than one priority level, scheduler 21 or 23 will attribute to the queue its highest assigned priority. However, it is possible that such a priority level may still be lower than the priority levels of other queues.

Schedulers 21 and 23 may comprise a dequeuing engine 50 which may remove packets from session queues A-E according to their priority levels as listed in active session lists 1-3. Dequeuing engine 50 may scan (arrow 52) active session lists 1-3, handling the lists in order of priority, highest to lowest. For each list, dequeuing engine 50 may handle the session queues listed therein in order, removing a session queue label from the list and testing that session for its eligibility to transmit a packet. Dequeuing engine 50 may return to the highest priority after handling another priority in order to reduce the latency of the highest priority at the cost of increasing the potential latency of other priorities.

Dequeuing engine 50 may attempt to transmit all packets in the currently serviced queue. If, after handling a session queue, packets remain in the session queue being serviced (due to ineligibility to transmit packets), dequeuing engine 50 may recalculate the session priority and may return the associated session label to the active session list corresponding to the recalculated session priority. However, if packets are transmitted from the associated session queue and the queue then becomes empty, the session is not returned to the active session list and thus, becomes inactive. It will become active again once more packets 40 arrive at the unit.

Dequeuing engine 50 may return a session label to the active session list in any suitable manner For example, engine 50 may return it to the tail of the active session list. Alternatively, engine 50 may shuffle the sessions around in the active session list or may read sessions from the active session list in a random order Such "shuffling" typically occurs after the entire list has been processed within a single scan.

Dequeuing engine 50 may move on to a lower priority active session list once all sessions in the current list have been serviced and none are eligible to transmit packets.

Dequeuing engine 50 may determine the priority level of each session in any suitable manner In accordance with a preferred embodiment of the present invention, for two priority levels, the calculation may be as follows:

if the actual rate of transmission (determined as described hereinbelow) is at or below a minimum rate, then the session queue is given a maximum priority level; and if the actual rate of transmission is between the minimum and a maximum rate of transmission, then the session queue is given a minimum priority level.

For multiple priority levels, there may be multiple threshold rates with decreasing priority levels above each threshold rate.

Figure 6:
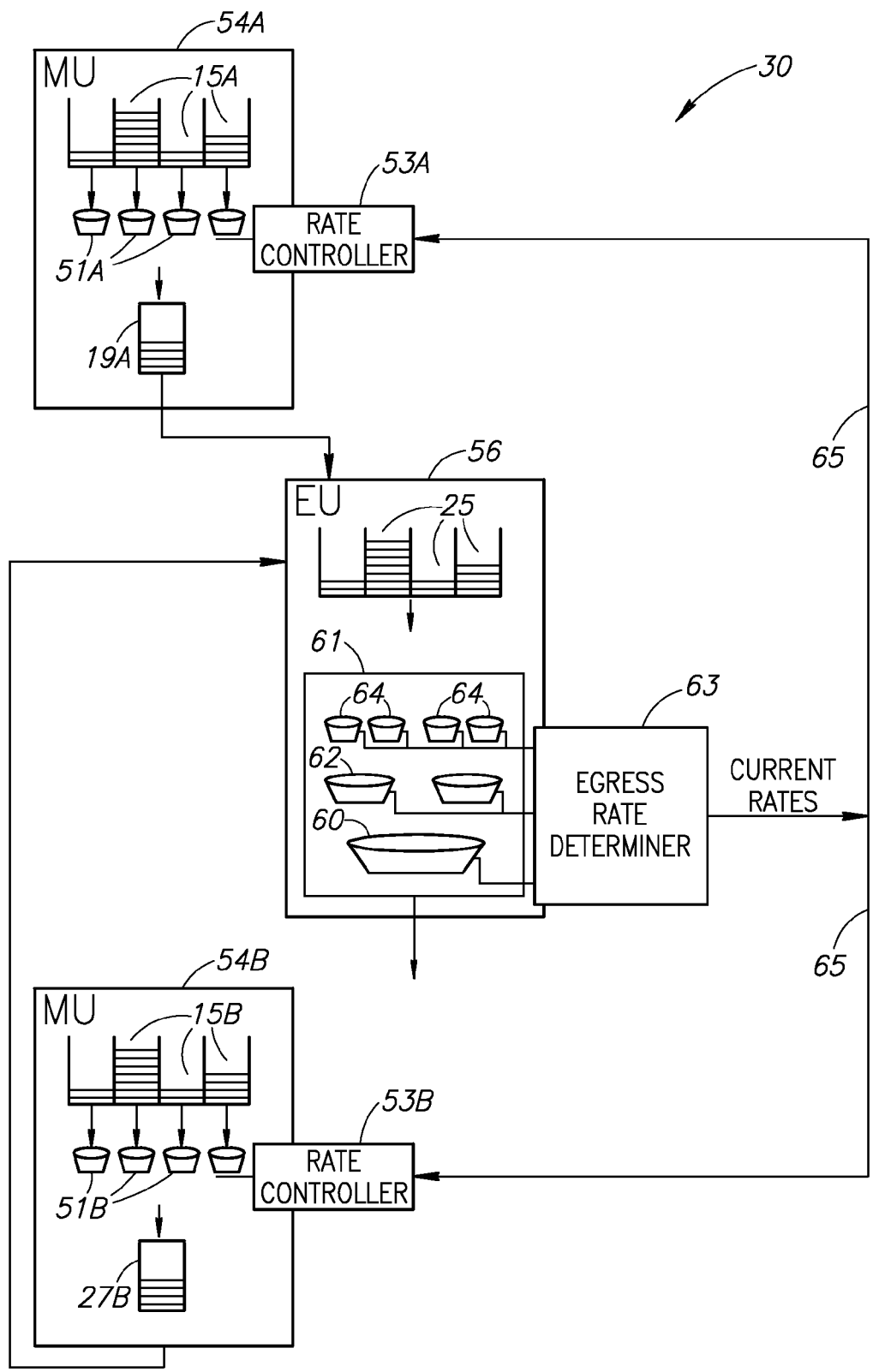
FIG. 6 is a schematic illustration of congestion determination and control in the grid router of FIG. 2.

Reference is now made to FIG. 6, which illustrates an alternative embodiment of the congestion determination of grid router 30. In this embodiment, per session, shapers 17 may be implemented as token bucket type shapers 51. Once again, only a portion of grid router 30 is shown and similar reference numerals refer to similar elements of previous figures.

As is known in the art, token bucket shapers may store "tokens" representing data to be transmitted, one token per each unit of data. Whenever a unit of data, such as a byte, is transmitted, a token is "cashed in". The shaper has a maximum bucket size (which corresponds to a maximum burst size) and the number of tokens available at a given time corresponds to the current allowed number of data units that may be transmitted. If there are no tokens in the bucket, then no packets may be transmitted. Tokens are replenished based on the time that has passed since the last transmission of the shaper and the average rate it is allowed to transmit Typically, the number of tokens added to the token bucket is the minimum between the maximum bucket size and the multiplication of the time elapsed since last replenishment and the allowed shaper rate in terms of data units per time unit.

Applicants have realized that adding pre-conditions to token insertion may improve fairness when large packets compete with small packets on the same shaper. Exemplary pre-conditions may be ensuring that the number of tokens following the insertion exceeds a minimum threshold, such as the minimal number of tokens required to transmit a maximum size packet.

In accordance with a preferred embodiment of the present invention, the allowed rate of each per session, shaper 51 may be dynamically controlled. In this embodiment, each mailbox unit, here labeled 54, may comprise per session, token bucket shapers 51, and a rate controller 53. Each egress unit 56 may comprise a hierarchical shaper unit 61, with multiple token bucket shapers, and an egress rate determiner 63. FIG. 6 shows one egress unit 56 and two mailbox units 54A and 54B, whose elements are labeled A or B, respectively.

Hierarchical queuing shaper unit 61 may comprise a multiplicity of token bucket shapers 60, 62 and 64, representing different elements affecting the transmission to the subscriber For example, there may be a token bucket shaper 60 per DSLAM (DSL Access Multiplexer), a token bucket shaper 62 per DSL subscriber, and a token bucket shaper 64 per session or service to the subscriber. As can be seen in FIG. 6, the shapers are organized into a hierarchy, where there are typically many more session shapers 64 than subscriber shapers 62, and more subscriber shapers 62 than DSLAM shapers 60. Each token bucket shaper 60-64 may have different rates, different amounts of tokens, etc., depending on the abilities of the device it represents. Shapers are "connected" in a hierarchy, such that, when considering the transmission of a packet, transmission is allowed if there are a sufficient number of tokens in the all of the token buckets in the path from the current shaper to the output (i.e. below it in the hierarchy).

In accordance with a preferred embodiment of the present invention, rate determiner 63 may measure the effective transmission rates of session shapers 64, by noting how many packets or tokens are transmitted during a given period. Rate determiner 63 may also deduce congestion level information, from the backlog or lack thereof in input queues 25. Rate determiner 63 may use the congestion levels to decide if the rates need to be changed and may use the rate information as a basis to calculate the desired transmission rate for each session shaper 51 of mailbox units 54, in an attempt to provide the most optimal transmission rates through grid router 30. Rate determiner 63 may provide this backpressure rate information to the appropriate rate controller 53A or 53B which, in turn, may instruct the relevant session shaper 51A or 51B to change its rate. It is possible that the rate for controller 53A may be different than for controller 53B since the congestion levels between mailbox unit 54A and egress unit 56 may be different than between mailbox unit 54B and egress unit 56.

Rate determiner 63 may transmit the backpressure rate information on separate, back channels 65 and the transmission may generally be short and fast. Thus, the mechanism shown in FIG. 6 may be able to respond relatively quickly to changes in transmission rates.

Hierarchical queuing shaper 61 may test the eligibility of each packet to transmit from the top of the shaper hierarchy (i.e. shaper 60) on down. Transmission is allowed if there are enough tokens for transmission through all shapers in the path related to this session. If, for a given level, transmission is not currently allowed, the token bucket is marked as currently blocked and none of the token buckets lower in the hierarchy need to be checked. Transmission will not happen down that path until the blocked token bucket becomes unblocked. Token buckets become unblocked when dequeuing engine 50 (FIG. 5) begins a scan (shown by arrow 52) through active lists 1-3.

Moreover, if a token bucket is blocked at a given time for a given priority, until that priority is granted transmission or if such grant becomes irrelevant to that priority, no lower priority packets may transmit through it even if the token bucket has been replenished in the meantime.

Rate determiner 63 may maintain incoming and outgoing byte counters per session token bucket 64. By subtracting these counters from each other (per token bucket), the level of congestion of the token bucket may be identified. A congestion level exceeding a predetermined high watermark may indicate that the outgoing rate from the shaper may be below the incoming rate. Hence, rate determiner 63 may indicate to the rate controller 53 feeding that token bucket to reduce the allowed rate of the relevant session shaper 51, thereby reducing the incoming rate. If the byte count is at or below a low watermark (e.g. zero), this may indicate that shaper 64 may be able to service more traffic than is actually arriving. In this case, rate determiner 63 may indicate to the relevant rate controller 53 to gradually increase the allowed rate (i.e. to increase incoming traffic) of the relevant session shaper 51 or rate determiner 63 may indicate to the shapers below the current one in the hierarchy to increase their allowed rate to increase the outgoing traffic.

Rate determiner 63 may indicate a desired rate or may indicate the direction and rate of change (i.e. to increase or decrease the rate). The rate of change may be defined in terms of percentage of a maximum rate, a percentage of the current rate or in terms of absolute increments.

For example, in accordance with one embodiment of the present invention, the rates may be updated (by rate controllers 53 or by determiner 63) as follows:

Rate increment—set the allowed rate (ALLOWRATE) to be ALLOWRATE+X % where X is a percentage of the maximal rate allowed for the given session. In other words, the allowed rate is incremented by a fixed percentage of the maximal allowed rate. This may allow a session with a higher maximal allowed rate to consume bandwidth faster than sessions with a lower maximal allowed rate, which is typically considered fair use.

Rate decrement—set ALLOWRATE to be ACTRATE (e.g. the actual rate). In other words, the allowed rate is dropped to the rate that is actually being forwarded.

An alternative approach to be considered for rate updates, which may utilize a percentage of the currently allowed rate (implying exponential increments), may be:

Rate increment—set ALLOWRATE to be (MAXRATE+ALLOWRATE)/2. In other words, the allowed rate is incremented faster, the further away it is from the maximum allowed rate for the shaper. If (MAXRATE<110%*ALLOWRATE) set ALLOWRATE to be MAXRATE (to prevent infinitesimal updates).

Rate decrement—set ALLOWRATE to be (ALLOWRATE+ACTRATE*3)/4. In other words, instead of dropping the rate immediately to the actual rate, do so in gradually decreasing steps with a weighted average function biased towards the ACTRATE. Again, to eliminate infinitesimal update, set ALLOWRATE to be ACTRATE once (ALLOWRATE<110%*ACTRATE).

Other rate update methods, including combinations of some of the methods above, are possible and are included in the present invention. In addition, there may be additional conditions governing the eligibility to change the indications, such as the time elapsed since the most recent update.

It will be appreciated that egress rate determiner 63 may control the rates of token buckets 51 in mailbox units 54. Thus, grid router 30 may have a distributed rate control, distributed between mailbox units 54 and egress units 56.

Figure 7:
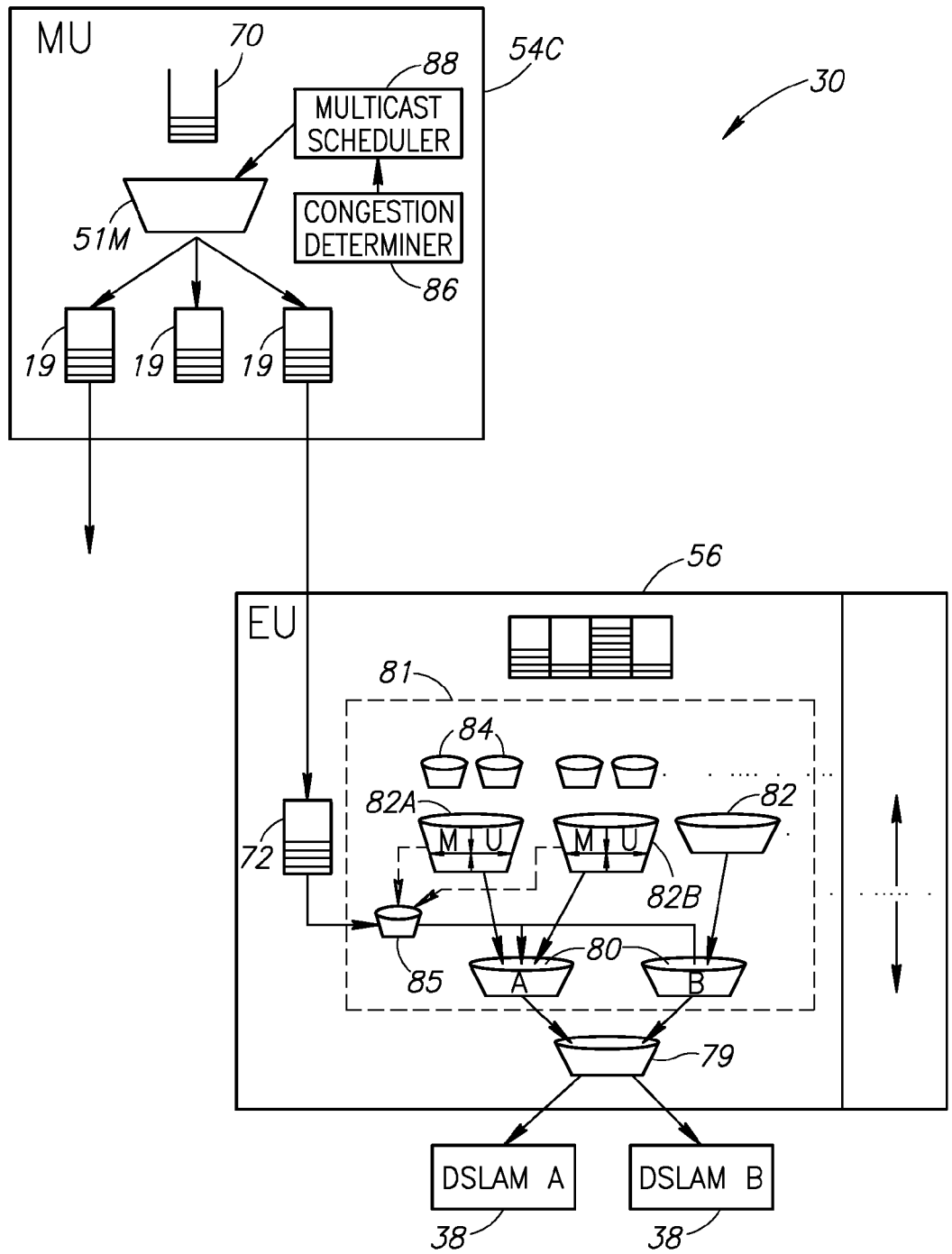
FIG. 7 is a schematic illustration of the operation of the grid router of FIG. 2 for multicast sessions.

Reference is now made to FIG. 7, which illustrates the operation of grid router 30 for multicast sessions. Multicast sessions may carry data from a single source to multiple destinations. For example, they may carry video data from a video source to the many subscribers who wish to view the video. Since grid router 30 opens a session for every service to which a subscriber subscribes, grid router 30 could have multiple copies of the video data from the video source. Instead, grid router 30 opens a single "multicast session", stored in a multicast session queue 70 in a mailbox unit, here labeled 54C, to handle all subscribers subscribed to the multicast service. As opposed to the unicast sessions discussed hereinabove, which connect a single input stream with a single output device, multicast session queue 70 may serve multiple subscribers, which may be located in many different locations. Accordingly, grid router 30 may connect multicast session queue 70 to multiple output queues 19, each one associated with a different egress unit, here labeled 56. For clarity, FIG. 7 shows only a single egress unit 56. Egress unit 56 may comprise a multicast session queue 72 to receive packets from its associated output queue 19, and a hierarchical queuing shaper unit 81, designed for multicast shaping, with session shapers 84, subscriber shapers 82, DSLAM shapers 80 and an interface shaper 79.

Egress unit 56 may transfer the packets in multicast queue 72 to the external devices (DSLAMs, etc) based on knowledge of the replication abilities of the external network to which the multicast session may be sending. Some external resources, such as most DSLAMs 38, may be capable of replicating multicast packets and thus, grid router 30 may send each of these devices only one copy of each multicast packet. If there are multiple external devices or if there is an external device that is not capable of replicating to multiple required destinations, then egress unit 56 may perform the replication internally.

Since the hierarchy of shapers in shaping unit 81 typically models external entities, egress unit 56 may connect multicast session queue 72 only to those shapers that represent a single external entity capable of packet replication, even if they appear as an intermediate stage shaper within the shaper hierarchy. Thus, while multicast session 72 may have its own session shaper 85, shaper 85 may be directly connected to DSLAM shapers 80. If there are multiple DSLAMs 38 connected to egress unit 56, as is shown as an example in FIG. 7, then multicast session shaper 85 may be connected to each one of the corresponding DSLAM shapers 80. In their token budget, DSLAM shapers 80 may consume separate tokens for each byte of a multicast packet sent through them. Moreover, when considering the transmission of a multicast packet (as opposed to a unicast packet), transmission is allowed if there are a sufficient number of tokens in the token buckets of the shapers below multicast session shaper 85 in the hierarchy.

While the above may be efficient, Applicants have realized that it is insufficient, as it does not account for each subscriber's separate receipt of the packet. Thus, in accordance with a preferred embodiment of the present invention, every subscriber session shaper 82 of a subscriber receiving the multicast service may also consume tokens utilized by multicast session 72. To do so, when a subscriber joins a multicast session, egress unit 56 may "join" the subscriber session shaper 82 for the subscriber to the relevant multicast session shaper 85. In FIG. 7, subscriber session shapers 82A and 82B are joined to multicast session shaper 85, via the dashed arrows.

When hierarchical queuing shaper 81 may consider transmission of unicast packets through a subscriber session shaper 82 that is joined to multicast session shaper 85, every token consumed by multicast session shaper 85 since the last time a unicast packet was transmitted through subscriber session shaper 82, may first be deducted from the token budget of the shaper (e.g. subscriber session shaper 82). The remaining tokens may be available for transmitting the unicast packets. It will be appreciated that, sometimes, the multicast token deduction may result in a token bucket having a remaining negative token budget, and the unicast packets may be denied transmission.

It will be appreciated that tokens may be deducted from other shaper levels as well. By joining each shaper to all its related multicast sessions, it is possible to deduct tokens for every one of the relevant multicast sessions.

It will be appreciated that, by deducting the forwarding credit of the multicast session, hierarchical queuing shaper 81 may account for the actual multicast traffic, which may be variable, rather than a fixed expected amount of multicast traffic. This may provide a relatively efficient management of resources.

For multicast traffic, mailbox unit 54 may comprise a congestion determiner 86, similar to congestion determiner 46 of FIG. 4, and a multicast scheduler 88 responsible for scheduling multicast session queue 70. When congestion determiner 86 may determine, as described hereinabove, that all output queues 19 (or their associated links) associated with multicast session queue 70 may be non-congested, (indicating that traffic may be flowing through grid router 30), multicast scheduler 88 may allow transmission from multicast session queue 70. Shaper 51M may then send the current multicast packet to all output queues 19.

When all associated output queues 19 may be congested, then multicast scheduler 88 may drop or delay the multicast packet. When some associated output queues 19 may be congested while others may not be congested, multicast scheduler 88 may allow transmission for the non-congested queues while dropping or delaying to the rest, or multicast scheduler 88 may delay to them all.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
on a gridrouter:
connecting a multicast session, token bucket shaper with token bucket shapers of external devices;
joining at least session token bucket shapers used for unicast sessions to said multicast session, token bucket shaper; and
prior to transmitting unicast packets, deducting tokens consumed by said multicast session from token budgets of said unicast session token bucket shapers.

2. The method according to claim 1 and wherein at least one of said external devices is capable of packet replication.

3. A method according to claim 1, further comprising:
attributing a plurality of priorities to a single traffic session as said session moves through a router while keeping packet order within the session, wherein said attributing comprises changing the priority for forwarding packets of said single traffic session to one of said plurality of priorities in response to network conditions, said changing of priority comprising decreasing said priority as a congestion condition of said network conditions increases.

4. A method comprising:
on a gridrouter:
connecting a multicast session, token bucket shaper with token bucket shapers of external devices;
joining at least session token bucket shapers used for unicast sessions to said multicast session, token bucket shaper; and
prior to transmitting unicast packets, deducting tokens consumed by said multicast session from a token budget of said session token bucket shaper and also comprising joining a hierarchy of unicast token bucket shapers to said multicast session, token bucket shaper.

* * * * *